US010848575B2

(12) United States Patent
Kondo

(10) Patent No.: US 10,848,575 B2
(45) Date of Patent: Nov. 24, 2020

(54) SERVER AND NON-TRANSITORY COMPUTER-READABLE STORAGE MEDIUM STORING COMPUTER PROGRAM FOR SERVER

(71) Applicant: Suncorporation, Konan (JP)

(72) Inventor: Makoto Kondo, Konan (JP)

(73) Assignee: Suncorporation, Konan (JP)

( * ) Notice: Subject to any disclaimer, the term of this patent is extended or adjusted under 35 U.S.C. 154(b) by 20 days.

(21) Appl. No.: 15/757,179

(22) PCT Filed: Sep. 2, 2015

(86) PCT No.: PCT/JP2015/075008
§ 371 (c)(1),
(2) Date: Mar. 2, 2018

(87) PCT Pub. No.: WO2017/037905
PCT Pub. Date: Mar. 9, 2017

(65) Prior Publication Data
US 2018/0255148 A1 Sep. 6, 2018

(51) Int. Cl.
*G06F 15/173* (2006.01)
*H04L 29/08* (2006.01)
(Continued)

(52) U.S. Cl.
CPC .......... *H04L 67/16* (2013.01); *G06F 16/9535* (2019.01); *H04M 11/00* (2013.01); *H04Q 9/00* (2013.01)

(58) Field of Classification Search
CPC .......... H04L 12/2807; H04L 12/40117; H04L 47/70; H04L 67/025; H04L 67/146;
(Continued)

(56) References Cited

U.S. PATENT DOCUMENTS 6,650,346 B1    11/2003  Jaeger et al.
6,801,507 B1 *  10/2004  Humpleman ..... H04L 12/40117
                                                                370/252

(Continued)

FOREIGN PATENT DOCUMENTS

JP    2006215998    8/2006
JP    2014021627    2/2014
JP    2014203184    10/2014

OTHER PUBLICATIONS

Written Opinion for Application No. PCT/JP2015/075008, dated Nov. 17, 2015 (5 pages).

(Continued)

*Primary Examiner* — Dustin Nguyen
(74) *Attorney, Agent, or Firm* — K&L Gates LLP

(57) ABSTRACT

A server 10 may acquire condition data indicating an aggregation condition from a setting terminal 70 (S40), and store the same in a memory (S42). Then, every time device data is acquired from a device 60, the server 10 may store the acquired data in the memory (S50 to S56, S64, S66). The server 10 may execute partial aggregation in accordance with the device data stored in the memory and the aggregation condition indicated by the condition data, and create partially aggregated data (S60, S70). The server 10 may store the created partially aggregated data in the memory (S62, S72). In a case where a browsing request is acquired from a browsing terminal, the server 10 may use the partially aggregated data in the memory to create browsing data, and supplies the same to the browsing terminal.

5 Claims, 14 Drawing Sheets

(51) Int. Cl.
*G06F 16/9535* (2019.01)
*H04M 11/00* (2006.01)
*H04Q 9/00* (2006.01)

(58) Field of Classification Search
CPC . H04N 1/00; H04N 21/8133; H04M 1/72519; G06Q 10/06; H04W 4/70
See application file for complete search history.

(56) References Cited

U.S. PATENT DOCUMENTS

| | | | |
|---|---|---|---|
| 7,191,097 B1* | 3/2007 | Lee | G06Q 10/06 |
| | | | 702/183 |
| 2007/0043538 A1 | 2/2007 | Johnson et al. | |
| 2013/0211546 A1 | 8/2013 | Lawson et al. | |
| 2014/0331144 A1* | 11/2014 | Kim | H04L 67/025 |
| | | | 715/739 |
| 2015/0153982 A1* | 6/2015 | Berarducci | H04N 1/00 |
| | | | 358/1.15 |
| 2015/0206104 A1 | 7/2015 | Suzuki et al. | |
| 2015/0358777 A1* | 12/2015 | Gupta | H04L 12/2807 |
| | | | 370/254 |
| 2016/0179962 A1* | 6/2016 | Patten | H04L 47/70 |
| | | | 707/706 |
| 2016/0316034 A1* | 10/2016 | Herrick | H04L 67/146 |
| 2016/0353305 A1* | 12/2016 | Zakaria | H04M 1/72519 |
| 2017/0064412 A1* | 3/2017 | Taxier | H04N 21/8133 |
| 2018/0205793 A1* | 7/2018 | Loeb | H04W 4/70 |

OTHER PUBLICATIONS

International Search Report for Application No. PCT/JP2015/075008, dated Nov. 17, 2015 (4 pages).
"Rediscover M2M", Nikkei Electronics, p. 23-41, Jan. 6, 2014.

* cited by examiner

| Device Unique Number | Type Information | Time Information |
|---|---|---|
| 1001 | A | t1 |
| 1001 | B | t2 |
| 1001 | B | t3 |
| 1001 | A | t4 |
| 1001 | A | t5 |
| 1001 | B | t6 |
| 1001 | A | t7 |

| Item | Value | Type |
|---|---|---|
| Name | Company | Text |
| DispName | Company | Text |
| ValueType | 0 | Integer |
| ValueRule | 0 | Integer |
| TargetType | 0 | Integer |
| Signal Number | 5 | Integer |

FIG. 10

| Device Type Number | Device Type Name |
|---|---|
| 1 | Oven |
| 2 | Microwave Oven |
| 3 | Dishwasher |
| 4 | IH Cooktop |
| 5 | Gas Cooktop |

FIG. 11

| Device Unique Number | Device Type Number | Name | Manufacturer |
|---|---|---|---|
| 1001 | 1 | Kiln Oven | T-Electronics |
| 1002 | 1 | Kiln Oven | T-Electronics |
| 1003 | 1 | Big Oven | P-Electric |
| ⋮ | | | |
| 2001 | 2 | Healthy Microwave Oven | H-Electric |
| 2002 | 2 | Chef's Microwave Oven | M-Manufacturing |
| 2003 | 2 | Chef's Microwave Oven | M-Manufacturing |
| ⋮ | | | |
| 3001 | 3 | Wash-Boy | L-System |
| 3002 | 3 | Big-Dishwasher | SS-Manufacturing |
| 3003 | 3 | Convenient-Wash | Q-Electronics Industry |
| ⋮ | | | |
| ⋮ | | | |
| 5001 | 5 | KK1-301 | A-Industry |
| 5002 | 5 | KK1-301 | A-Industry |
| 5005 | 5 | KK1-401 | A-Industry |
| 5009 | 5 | QW1-3-05 | B-System |

FIG. 12

| Company Number | Company Name |
|---|---|
| 1 | S-Café |
| 2 | M-Burger |
| 3 | D-Pizza |

FIG. 13

| Company Number | Store Group Number | Store Group Name |
|---|---|---|
| 1 | 12 | Kanto |
|  | 14 | Chubu |
|  | 15 | Kansai |
| 2 | 11 | Tohoku |
|  | 12 | Kanto |
|  | 13 | Hokuriku |
|  | 14 | Chubu |
| 3 | 10 | Hokkaido |
|  | 11 | Tohoku |
|  | 12 | Kanto |
|  | 14 | Chubu |

FIG. 14

| Store Number | Store Name |
|---|---|
| 170 | S-Café Marunouchi Store |
| 171 | S-Café YaesuStore |
| 172 | S-Café ShinagawaStore |
| 173 | S-Café Akihabara Store |
| 174 | S-Café Meieki Store |
| 175 | S-Café Sakae Store |
| 176 | S-Café Konan Store |
| 177 | S-Café Kyoto Store |
| 178 | S-Café Higashi-Osaka Store |
| 179 | S-Café Umeda Store |
| 180 | S-Café Tsuruhashi Store |

FIG. 15

| Store Group Number | Store Number |
|---|---|
| 12 | 170 |
| 12 | 171 |
| 15 | 180 |

FIG. 16

| Device Unique Number | Starting Date of Use | End Date of Use | Repair Date |
|---|---|---|---|
| 1001 | | | |
| 1002 | | | |
| 2001 | | | |
| 3002 | | | |
| 4001 | | | |

FIG. 17

| Device Unique Number | Cumulative Value of Signal A | Cumulative Value of Signal B | Cumulative Value of Signal C |
|---|---|---|---|
| 1001 | | | |
| 1002 | | | |
| 2001 | | | |
| 3002 | | | |
| 4001 | | | |

FIG. 18
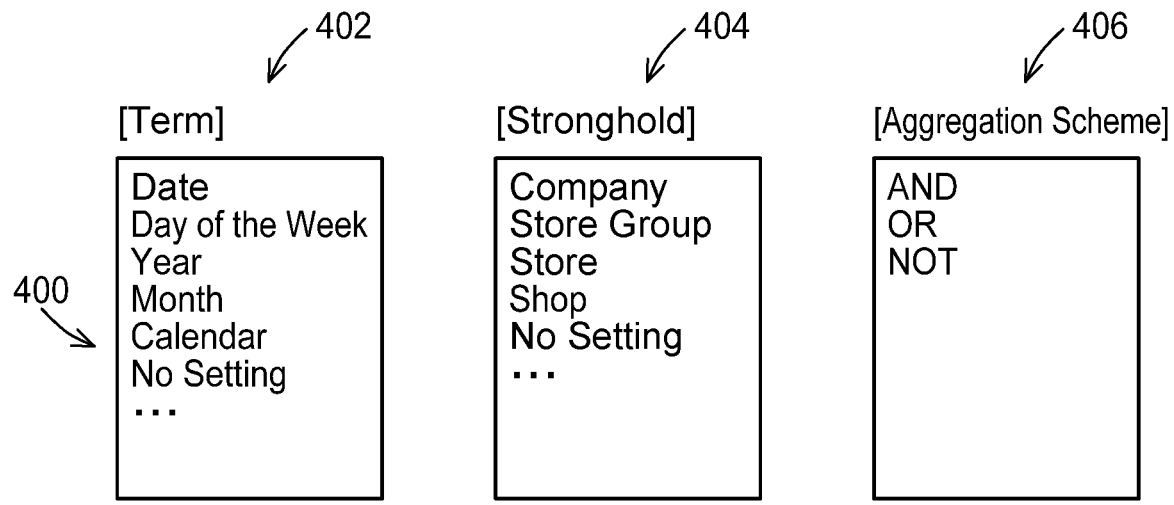
AND
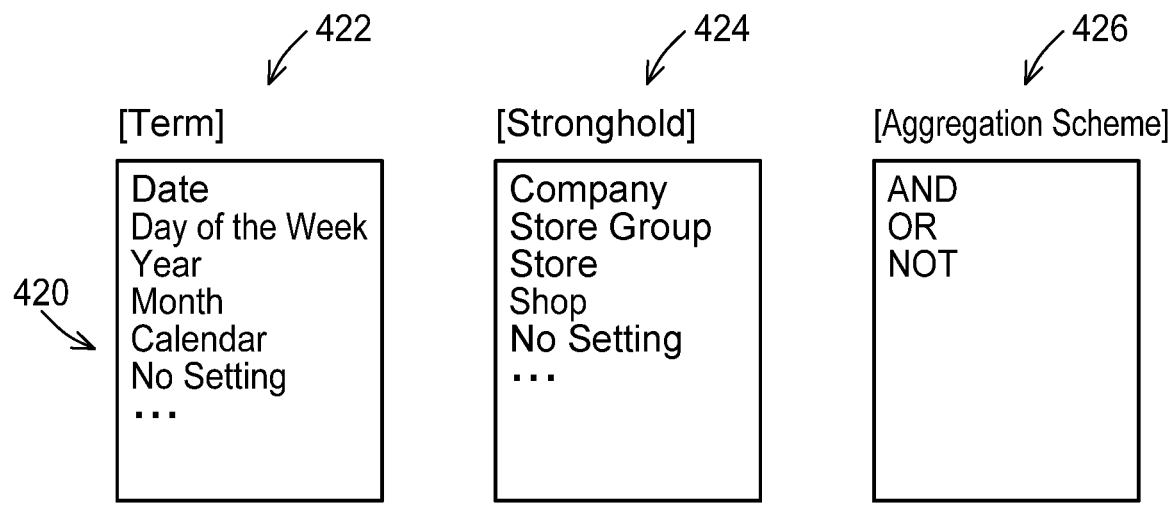
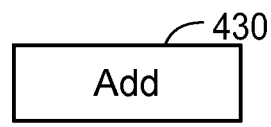
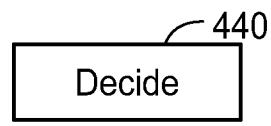

FIG. 19

\<Condition Data C1\>

| [Term] | [Stronghold] | [Aggregation Scheme] |
| --- | --- | --- |
| 2015 | Kanto | AND |

AND

| [Term] | [Stronghold] | [Aggregation Scheme] |
| --- | --- | --- |
| Monday | No Setting | NOT |

⇒ "Create Partially Aggregated Data of Each of Devices Installed in Kanto District in 2015, Except for Data of Monday"

\<Condition Data C2\>

| [Term] | [Stronghold] | [Aggregation Scheme] |
| --- | --- | --- |
| No Setting | S-Café, Marunouchi Store" | AND |

⇒ "Create Partially Aggregated Data of Each of Devices Installed in S-Café, Marunouchi Store"

FIG. 20

(Data Browsing Screen)
Microwave: Kanto Area : S-Café : Within 1 Month

| Store | A-State | B-State | C-State |
|---|---|---|---|
| S-Café Marunouchi Store | 100 | 50 | 40 |
| S-Café Yaesu Store | 10 | 20 | 5 |
| S-Café Shinagawa Store | 1 | 10 | 30 |
| S-Café Akihabara Store | 15 | 30 | 50 |

SERVER AND NON-TRANSITORY COMPUTER-READABLE STORAGE MEDIUM STORING COMPUTER PROGRAM FOR SERVER

CROSS-REFERENCE TO RELATED APPLICATION

This application is a U.S. National Stage Entry under 35 U.S.C. § 371 of International Patent Application No. PCT/JP2015/075008, entitled SERVER AND COMPUTER PROGRAM, filed Sep. 2, 2015, the entire disclosure of which is hereby incorporated by reference herein.

TECHNICAL FIELD

The technique disclosed in the description herein relates to a server configured to acquire data from a device, and create and supply browsing data based on the acquired data.

BACKGROUND ART

For example, "Rediscover M2M" in Nikkei Electronics Jan. 6, 2014 (hereinbelow termed Non-Patent Literature 1) describes a system that monitors operating states of construction machinery, a system that monitors operating states of elevators, a system that collects sales result information of vending machines, and the like as examples of a system using an M2M (abbreviation of Machine To Machine) communication.

SUMMARY OF INVENTION

Technical Problem

In each of the systems of Non-Patent Literature 1, each device (construction machine, elevator, vending machine, etc.) supplies a server with information indicating its operating state. The server creates a database using the data collected from the respective devices. The server uses data in the database to create browsing data for browsing in response to a request from a management device that manages the respective devices, and supplies the created browsing data to the management device. Due to this, a user of the management device (for example, an administrator of the system) can acknowledge the operating states of the respective devices and the like.

In a system as above, when a number of devices being management targets becomes large, burden on the server upon creating the browsing data becomes high, and a long time may be required to create the browsing data in some cases.

The description herein provides a technique that can create browsing data in a short period of time, and that can reduce burden on a server.

One aspect of the present teachings relates to a server for acquiring device data from each of a plurality of devices and storing the acquired device data in a memory. The server may comprise a device data acquiring unit, a device data storing unit, a partial aggregating unit, a partially aggregated data storing unit, a request acquiring unit, a browsing data creating unit, and a browsing data supplying unit. The device data acquiring unit may be configured to acquire the device data from each of the plurality of devices. Each of the device data may include device specifying information for specifying corresponding one of the plurality of devices which is a supply source of the device data. The device data storing unit may be configured to store the acquired device data in the memory in accordance with a predetermined style. The predetermined style may include stronghold information related to installed locations of the plurality of devices and term information related to operating terms of the plurality of devices. The partial aggregating unit may be configured to aggregate a part of stored data in accordance with a preset aggregation condition and create partially aggregated data, and the stored data is the device data which are acquired from each of the plurality of devices and stored in the memory. The partially aggregated data storing unit may be configured to store the created partially aggregated data in the memory. The request acquiring unit may be configured to acquire a browsing request from a terminal device. The browsing data creating unit may be configured to create browsing data indicating operating status in the plurality of devices by using the partially aggregated data in the memory in a case where the browsing request is acquired. The browsing data supplying unit may be configured to supply the created browsing data to the terminal device.

Here, the "terminal device" includes a setting terminal for a user to create form data and a browsing terminal for the user to browse the browsing data. Further, the "device specifying information" is not limited to information unique to each device for specifying this device, and includes other arbitrary information which can unambiguously specify this device. Further, the "predetermined style" includes both a preset style and a style set by the user. Further, the "preset aggregation condition" includes any aggregation condition regardless of at which timing and by whom it is set. For example, the aggregation condition may automatically be set according to states of the devices. The "memory", the "server", and the "terminal device" may be configured as one integral device, or may be configured separately. In a case where the "memory", the "server", and the "terminal device" are configured separately, at least one of them may be communicably connected via a communication network and the like. The "browsing data" may include any data so long as the data is created using the partially aggregated data, and it is not limited to image information. The image information may be created by the terminal device that receives the browsing data.

According to the above configuration, the server creates the partially aggregated data in accordance with the preset aggregation condition, and when the server acquires the browsing request from the terminal device, it uses the partially aggregated data in the memory to create the browsing data, and supplies the created browsing data to the terminal device. That is, by having created the partially aggregated data in accordance with the preset aggregation condition, the server simply needs to create the browsing data using the partially aggregated data upon the creation of the browsing data. Due to this, burden upon creating the browsing data can be reduced. Due to this, the server can supply the terminal device with the browsing data within a short period of time. Thus, according to the aforementioned server, the browsing data can be created within a short period of time, and the burden on the server can be reduced.

A controlling method, a computer program, and a computer-readable recording medium storing the computer program for realizing the aforementioned server are also novel and useful. Further, a communication system comprising the aforementioned server, plurality of devices, and terminal device is also novel and useful.

BRIEF DESCRIPTION OF DRAWING

FIG. 10 shows a relational table of kitchen appliance type.

FIG. 11 shows a relational table of kitchen appliance.

FIG. 12 shows a relational table of company master.

FIG. 13 shows a relational table of store group master.

FIG. 14 shows a relational table of store master.

FIG. 15 shows a relational table of store.

FIG. 16 shows a relational table of installed device.

FIG. 17 shows a relational table of device-collected data.

FIG. 18 shows an example of an aggregation condition setting screen.

FIG. 19 shows an example of condition data.

FIG. 20 shows an example of a data browsing screen.

Figure 1:
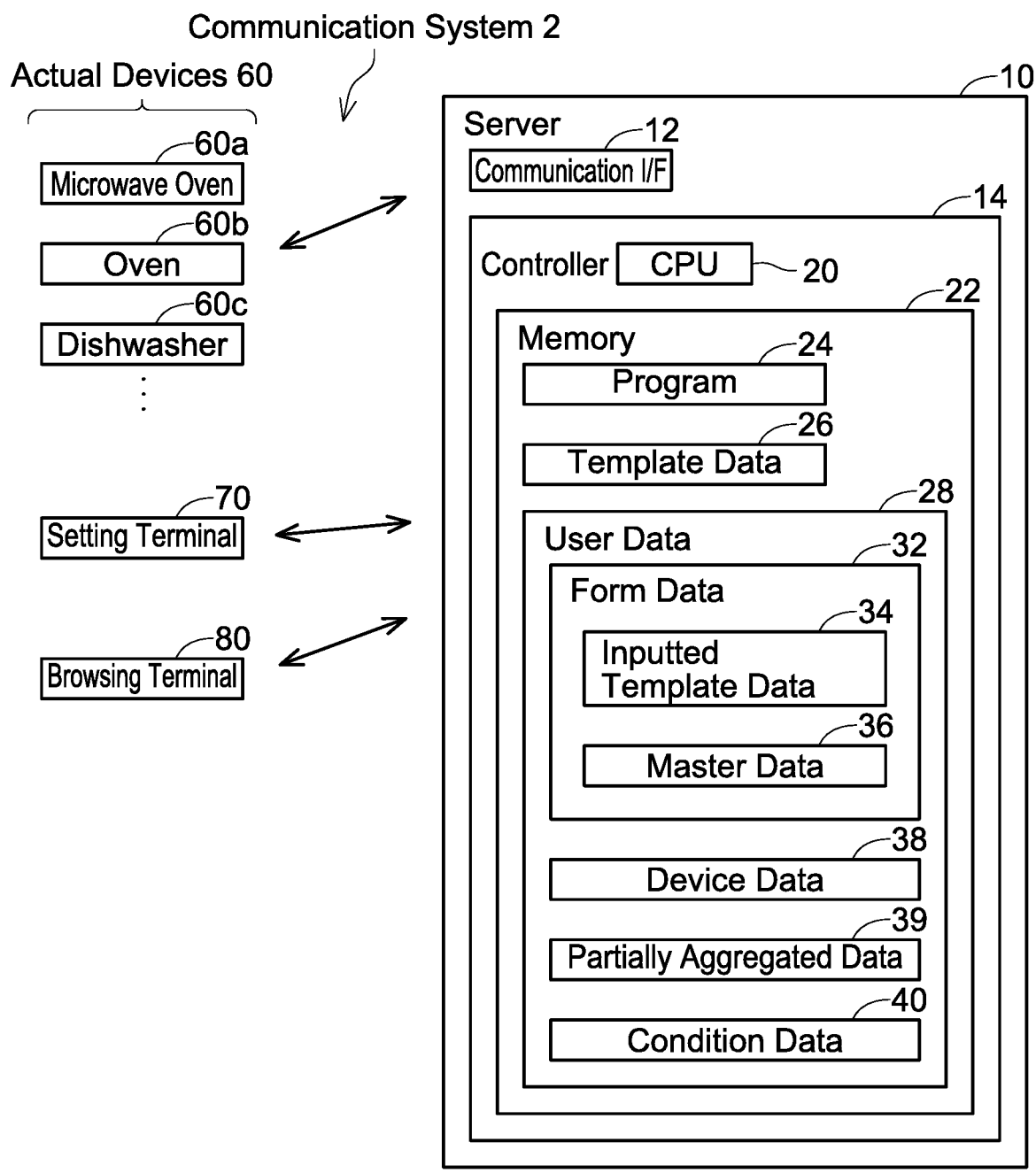
FIG. 1 shows a configuration of a communication system.

Some of the features characteristic to below-described embodiment will herein be listed. It should be noted that the respective technical elements are independent of one another, and are useful solely or in combinations. The combinations thereof are not limited to those described in the claims as originally filed.

(Feature 1) The partial aggregating unit may further aggregate, every specific period of time, data related to corresponding devices for each of a plurality of strongholds corresponding to the stronghold information, each of a plurality of term segments corresponding to the term information, and each of combinations thereof, and create the partially aggregated data.

According to the above configuration, the server creates the partially aggregated data, every specific period of time, for each of the plurality of strongholds, each of the plurality of term segments, and each of combinations thereof. Due to this, even if a new aggregation condition is set, such as a case where the aggregation condition has been changed, the server can create the partially aggregated data in accordance with this new aggregation condition within a short period of time.

(Feature 2) The aggregation condition may include information indicating a specific stronghold specified by a user among a plurality of strongholds corresponding to the stronghold information. The partial aggregating unit may aggregate data related to one or more devices installed at the specific stronghold among the stored data, and create the partially aggregated data.

According to the above configuration, the server creates the partially aggregated data that aggregated the data related to the one or more devices installed at the specific stronghold. The server can create the browsing data related to the specific stronghold within a short period of time.

(Feature 3) The server may further comprise a screen data supplying unit configured to supply the terminal device with setting screen data for displaying a setting screen for setting the aggregation condition; a condition data acquiring unit configured to acquire, from the terminal device, condition data indicating the aggregation condition that is set in accordance with the setting screen represented by the setting screen data; and a condition data storing unit configured to store the acquired condition data in the memory. The partial aggregating unit may create the partially aggregated data in accordance with the aggregation condition indicated by the condition data stored in the memory.

According to the above configuration, the user can set the aggregation condition in accordance with the setting screen. Due to this, the user can relatively easily set the aggregation condition.

(Feature 4) The aggregation condition may include an exclusion condition indicating a condition that does not require aggregation. The partial aggregating unit may create the partially aggregated data by excluding data corresponding to the exclusion condition from the stored data upon creating the partially aggregated data.

According to the above configuration, the server creates the partially aggregated data by excluding the data corresponding to the exclusion condition that does not require aggregation. Due to this, the server does not need to aggregate unnecessary data. Burden on the server can further be reduced.

(Feature 5) The browsing request may include a browsing condition specified by a user. The browsing data creating unit may create the browsing data in accordance with the browsing condition included in the browsing request by using the partially aggregated data in the memory in a case where the browsing request is acquired.

According to the above configuration, the server creates the browsing data using the partially aggregated data in the memory in accordance with the browsing condition included in the browsing request. That is, the server can supply the terminal device with the browsing data in accordance with the browsing condition desired by the user within a short period of time.

(Feature 6) In a case where the user specifies a first browsing condition, the request acquiring unit may acquire a first browsing request including the first browsing condition from the terminal device. In a case where the first browsing request is acquired, the browsing data creating unit may create first browsing data in accordance with the first browsing condition. In a case where the user further specifies a second browsing condition different from the first browsing condition after the user has specified the first browsing condition, the request acquiring unit may acquire a second browsing request including the second browsing condition from the terminal device. In a case where the second browsing request is acquired, the browsing data creating unit may create second browsing data in accordance with the second browsing condition.

According to the above configuration, even if the browsing condition that the user specified has been changed, the server can create new browsing data in accordance with the new and changed browsing condition and supply the same to the terminal device.

EMBODIMENT (Configuration of Communication System 2; FIG. 1)

As shown in FIG. 1, a communication system 2 comprises a server 10, a plurality of devices 60, a setting terminal 70, and a browsing terminal 80. The plurality of devices 60, the setting terminal 70, and the browsing terminal 80 are each configured to be capable of communicating with the server 10. In the example of FIG. 1, the plurality of devices 60 includes a microwave oven 60a, an oven 60b, and a dishwasher 60c, for example. In this embodiment, the plurality of devices 60 belongs to a specific user, for example. The specific user is a kitchen appliance manufacturer, who is a vendor of the plurality of devices 60.

Further, although not shown, the communication system 2 further includes a plurality of devices, a setting terminal, and a browsing terminal belonging to a user who is different from the specific user (hereinbelow referred to as "other user"). These devices, setting terminal, and browsing terminal belonging to the other user are also configured to be capable of communicating with the server 10. That is, the communication system 2 of the present embodiment can be said as including a first system for the specific user to manage the plurality of devices 60 using the server 10, and a second system for the other user to manage the plurality of devices belonging to this other user using the server 10. In this case, the first system includes the plurality of devices 60, the server 10, the setting terminal 70, and the browsing terminal 80. The second system includes the plurality of devices (not shown) belonging to the other user, the server 10, and the setting terminal and the browsing terminal (not shown) belonging to the other user.

(Plurality of Devices 60)

As above, the plurality of devices 60 includes the microwave oven 60a, the oven 60b, and the dishwasher 60c. The plurality of devices 60 includes device(s) other than the above devices that is not shown. Hereinbelow, each of the devices that are included in the plurality of devices 60 (for example, the microwave oven 60a) may simply be termed "device 60". Each of the plurality of devices 60 stores a device unique number for specifying this device. Further, each of the plurality of devices 60 can supply device data to the server 10. Here, the "device data" is data including device specifying information (that is, the device unique number) for specifying its corresponding device which is a supply source of the device data (hereinbelow, termed a specific device), type information indicating a type of an event that occurs in this specific device, and time information indicating time of the occurrence of the event in the specific device.

(Server 10)

The server 10 comprises a communication interface (hereinbelow referred to as "communication I/F") 12 and a control unit 14. The communication I/F 12 is an interface for communicating with external devices (for example, the plurality of devices 60, the setting terminal 70, and the browsing terminal 80). The control unit 14 comprises a CPU 20 and a memory 22. The CPU 20 executes various processes in accordance with a program 24 stored in the memory 22. The memory 22 is constituted of a ROM, a RAM, a hard disk, and the like.

The memory 22 stores the program 24 as above, template data 26, and user data 28.

The template data 26 is data for setting a style for storing the device data that the server 10 is to acquire from the devices (for example, the devices 60) of users using the server 10 (for example, the specific user) in the memory 22 of the server 10. In other words, the template data may be expressed as being data for inputting metadata related to each event occurring in the devices. The user who uses the server 10 accesses the server 10 and inputs information in accordance with the template data 26, and thereby can set the style for storing the device data in the memory 22 of the server 10 (that is, form data can be stored in the memory 22). Detailed contents of the template data 26 and detailed contents of the form data will be described later in detail.

The user data 28 includes various types of data related to the specific user's management of the plurality of devices 60. Although not shown, the memory 22 also stores other user data related to the other user's management of the devices belonging to the other user. However, hereinbelow, explanation will be given only for the user data 28 related to the specific user.

The user data 28 includes form data 32, device data 38, partially aggregated data 39, and condition data 40. The form data 32 includes inputted template data 34 and master data 36.

The form data 32 (that is, the inputted template data 34 and the master data 36) is data acquired from the setting terminal 70. That is, the specific user accesses the server 10 using the setting terminal 70 and inputs information in accordance with the aforementioned template data 26, by which the inputted template data 34 and the master data 36 can be created. The inputted template data 34 includes information indicating a stronghold structure related to installed locations of the plurality of devices 60 (that is, stronghold information). The master data 36 includes information related to device(s) installed in each of a plurality of strongholds indicated by the stronghold information. Examples of the inputted template data 34 (see FIGS. 8 and 9) and the master data 36 (see FIGS. 10 to 17) will be described later in detail. The form data 32 as above indicates the style for storing the device data acquired from the plurality of devices 60 in the memory 22. Further, the style indicated by the form data 32 also indicates a hierarchical levels structure for browsing the device data acquired from the plurality of devices 60. When the form data 32 as above is acquired from the setting terminal 70, the CPU 20 of the server 10 stores the acquired form data 32 in the memory 22.

The device data 38 is data that is created as a result of having stored the respective device data acquired from the plurality of devices 60 via the communication I/F 12 in the memory 22 in accordance with the style indicated by the form data 32. The device data 38 of FIG. 1 may include a large number of device data. In other words, the device data 38 of FIG. 1 can be expressed as being a cluster of the respective device data acquired from the plurality of devices 60.

The partially aggregated data 39 is data created as a result of having partially aggregated a part of the device data 38 in the memory 22 in accordance with the condition data 40 to be described later. The partially aggregated data 39 may include a large number of partially aggregated data. In other words, the partially aggregated data 39 of FIG. 1 can be expressed as being a cluster of a plurality of partially aggregated data created by the CPU 20.

The condition data 40 is data acquired from the setting terminal 70. The specific user accesses the server 10 using the setting terminal 70 and specifies a desired aggregation condition in accordance with a setting screen (see FIG. 18) displayed in the setting terminal 70, by which the condition data 40 indicating the aggregation condition as specified by the user can be created. Here, the aggregation condition is a condition for partially aggregating a part of the device data 38. The condition data 40 may include a plurality of condition data. In other words, the condition data 40 of FIG. 1 can be expressed as being a cluster of the plurality of condition data acquired from the setting terminal 70.

(Setting Terminal 70, Browsing Terminal 80)

The setting terminal 70 is a terminal device such as a PC of the specific user, for example. The browsing terminal 80 is a terminal device such as a tablet terminal of the specific user, for example. The setting terminal 70 and the browsing terminal 80 both comprise an operation unit, a display unit, and a control unit that are not shown. The setting terminal 70 and the browsing terminal 80 are each configured to be capable of communicating with the server 10 via a network that is not shown. In this embodiment, the setting terminal 70 and the browsing terminal 80 are configured as separate terminals. However, no limitation is made thereto, and in a variant, the setting terminal 70 and the browsing terminal 80 may be configured as one terminal.

Figure 2:
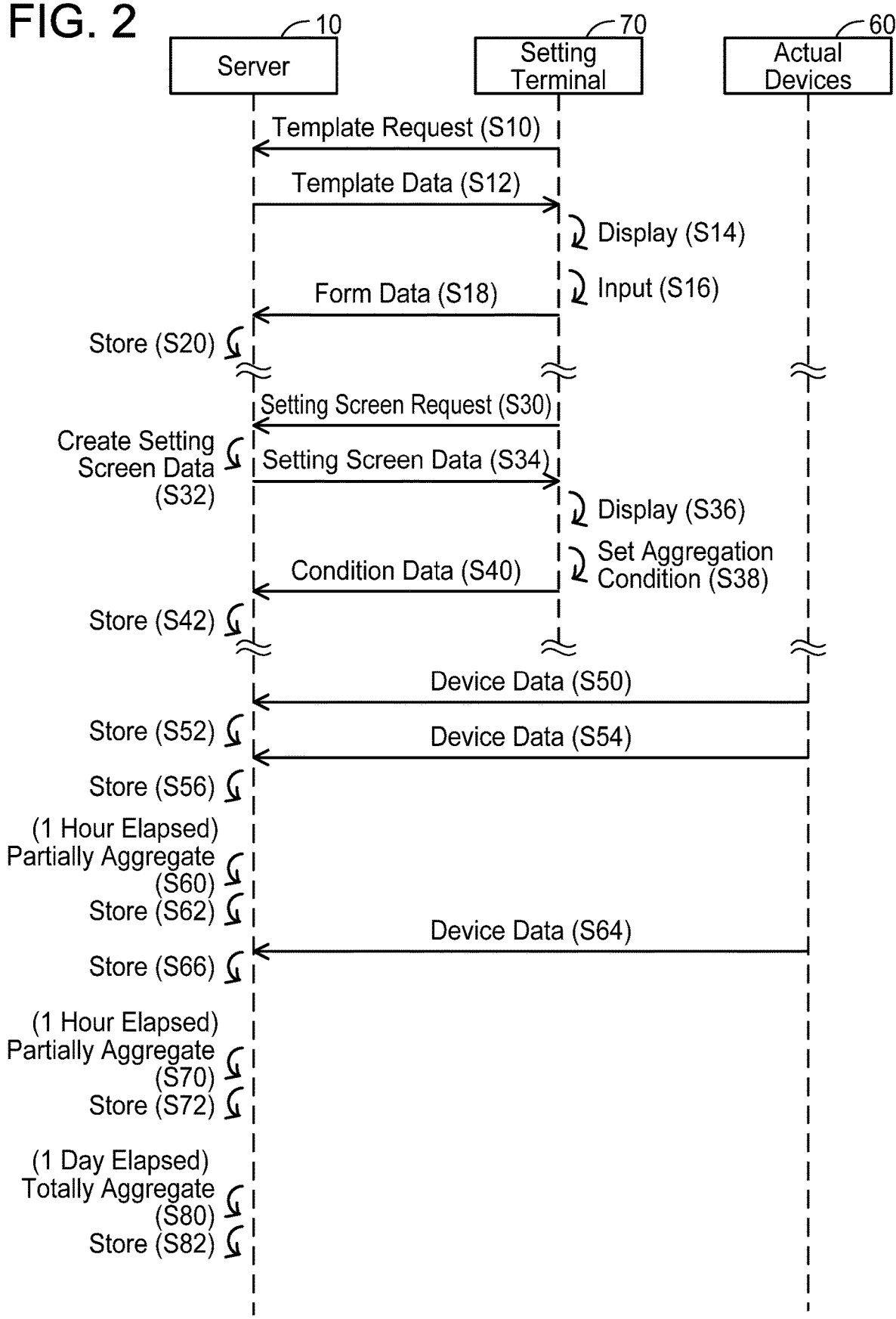
FIG. 2 shows a sequence chart (1) of an operation overview of the communication system.
Figure 3:
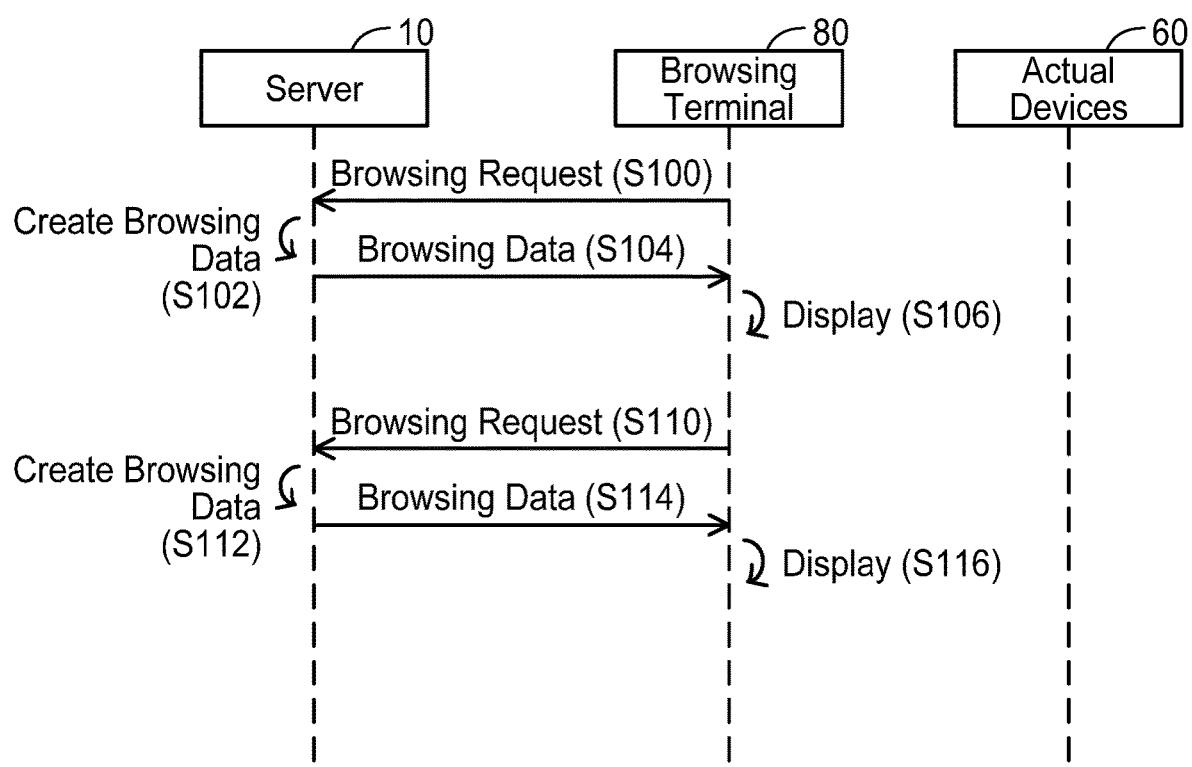
FIG. 3 shows a sequence chart (2) of the operation overview of the communication system.

(Overview of Operation of Communication System 2; FIGS. 2 and 3)

Next, an overview of operations of the respective constituent elements of the communication system 2 will be described with reference to FIGS. 2 and 3.

FIG. 2 shows the overview of operations of the respective constituent elements in a case where the server 10 acquires the form data and the condition data from the setting terminal 70, and thereafter acquires the device data from the devices 60.

The setting terminal 70 accesses the server 10 in accordance with an instruction from the specific user, and supplies a template request to the server 10 (S10).

When the template request is acquired, the CPU 20 of the server 10 supplies the setting terminal 70 with the template data 26 in the memory 22 (S12).

When the template data is acquired from the server 10, the setting terminal 70 displays a template data display screen in the display unit (S14). Contents of the template data display screen will be described later in detail (see FIG. 6). The specific user operates the operation unit of the setting terminal 70 to input information in accordance with the template data (S16). As a result, the inputted template data (see FIGS. 8 and 9) and the master data (see FIGS. 10 to 17) are created. The setting terminal 70 supplies the server 10 with the created inputted template data and master data (that is, the form data) (S18).

When the form data is acquired from the setting terminal 70, the CPU 20 of the server 10 stores the acquired form data in the memory 22 (S20) (see sign 32 in FIG. 1).

After this, the setting terminal 70 accesses the server 10 in accordance with an instruction of the specific user and supplies the server 10 with a setting screen request for displaying an aggregation condition setting screen (see FIG. 18) (S30).

When the setting screen request is acquired from the setting terminal 70, the CPU 20 of the server 10 creates setting screen data using the inputted template data 34 in the memory 22 (S32). That is, contents of the setting screen data created in S32 change depending on contents of the inputted template data 34. The CPU 20 supplies the created setting screen data to the setting terminal 70 (S34).

When the setting screen data is acquired from the server 10, the setting terminal 70 displays the aggregation condition setting screen (see FIG. 18) in the display unit (S36). Contents of the aggregation condition setting screen will be described later in detail. The specific user sets an aggregation condition in accordance with the aggregation condition setting screen (S38). As a result, condition data including the aggregation condition set by the specific user is created. The setting terminal 70 supplies the created condition data to the server 10 (S40).

When the condition data is acquired from the setting terminal 70, the CPU 20 of the server 10 stores the acquired condition data in the memory 22 (S42). Due to this, the condition data 40 of FIG. 1 is created in the memory 22.

After this, the devices 60 supply the server 10 with the device data each time an event (such as power turning on, heating started, abnormal operation, etc.) occurs in the devices 60 (S50, S54). As described above, each of the device data includes the device unique number for specifying the device 60, the type information indicating the type of the occurred event, and the time information indicating the occurrence time of the occurred event. A method by which the devices 60 create the device data and contents of the device data will be described later in detail with reference to FIGS. 4 and 5.

Every time the device data are acquired from the devices 60, the CPU 20 of the server 10 stores the acquired device data in the memory 22 (S52, S56). In storing the acquired device data in the memory 22, the CPU 20 stores the same in accordance with the style indicated by the form data 32 stored in the memory 22. Due to this, the device data 38 of FIG. 1 is created in the memory 22.

Further, the CPU 20 of the server 10 aggregates the device data that are included in the device data 38 every hour in accordance with the aggregation condition indicated by the condition data 40 in the memory 22 (S60). By so doing, the partially aggregated data in accordance with the aggregation condition is created. Hereinbelow, the aggregation of the device data executed in S60 (that is, the aggregation of the device data that is executed every hour in accordance with the aggregation condition) may in some cases be referred to as partial aggregation. Further, in S60, in a case where a plurality of condition data 40 is stored in the memory 22, the CPU 20 executes the partial aggregation in accordance with the aggregation conditions indicated by the respective condition data. In this case, a plurality of partially aggregated data is created. The CPU 20 stores the created partially aggregated data in the memory 22 (S62). Due to this, the partially aggregated data 39 of FIG. 1 is created in the memory 22.

After this, during the time until an hour elapses again, each device 60 supplies the server 10 with the device data every time an event occurs therein (S64).

Every time the device data are acquired from the devices 60, the CPU 20 of the server 10 stores the acquired device data in the memory 22 (S66).

After this, when an hour elapses since the previous partial aggregation (S60), the CPU 20 of the server 10 executes the partial aggregation of S60 again (S70). By so doing, the partially aggregated data in accordance with the aggregation condition indicated by the condition data 40 in the memory 22 is created (updated). The CPU 20 stores the created partially aggregated data in the memory 22 (S72).

Further, the CPU 20 of the server 10 aggregates the device data included in the device data 38 every day (every 24 hours) for all of the term segments and for all of the strongholds included in the inputted template data 34 and for combinations thereof (S80). That is, in S80, the CPU 20 executes the partial aggregation for every pattern for each of the term segments and each of the strongholds included in the inputted template data 34, and for the combinations thereof. The term segments, the strongholds, and the combinations thereof may be termed as "hierarchical levels". Hereinbelow, the aggregation executed in S80 (that is, the partial aggregation for every pattern including the term segments and the strongholds included in the inputted template data 34, and the combinations thereof) will be termed "collective aggregation". By the collective aggregation being executed in S80, the partially aggregated data corresponding to every pattern for the term segments and the strongholds included in the inputted template data 34, and the combinations thereof (that is, to all of the hierarchical levels) are created. The CPU 20 stores the created partially aggregated data in the memory 22 (S82).

As described above, in the present embodiment, the partially aggregated data in accordance with the aggregation condition indicated by the condition data 40 in the memory 22 is created once every hour. Meanwhile, the partially aggregated data corresponding to the all hierarchical levels are created every day.

Next, an overview of operations of the respective constituent elements in a case where the server 10 acquires a browsing request from the browsing terminal 80 and supplies the browsing terminal 80 with browsing data will be described with reference to FIG. 3. In an example below, a case where respective processes of FIG. 3 are executed after terminating the respective processes of FIG. 2 will be described.

The browsing terminal 80 accesses the server 10 in accordance with an instruction of the specific user, and sends the browsing request to the server 10 (S100). The browsing request includes information that indicates a browsing condition (for example, the term segments of operating terms of the devices 60 (that is, year, month, week, etc.), the strongholds of the devices 60 (that is, installed area, store, etc.), and combinations thereof) under which the browsing terminal 80 requests to browse the data.

When the browsing request is acquired from the browsing terminal 80, the CPU 20 of the server 10 creates the browsing data that indicates occurrence states of respective events in the device 60 based on the respective device data included in the device data 38 (see FIG. 1) in the memory 22, the form data 32, and the browsing condition included in the acquired browsing request (S102). At this occasion, the CPU 20 crates the browsing data indicating the occurrence states of the events corresponding to a hierarchical level indicated by the browsing condition (for example, the occurrence states of the events for each installed area). Further, upon creating the browsing data, the CPU 20 uses the partially aggregated data that had been created in advance (that is, the partially aggregated data 39). Since the CPU 20 creates the browsing data using the already-created partially aggregated data, there is no need to create the browsing data by executing aggregation of the data after having acquired the browsing request. Due to this, burden on the CPU 20 upon creating the browsing data can be mitigated. Further, the CPU 20 can create the browsing data within a short period of time after having acquired the browsing request from the browsing terminal 80 and supply the same to the browsing terminal 80. The specific user does not have to wait for a long time.

What sort of information is to be included in the browsing data changes depending on the contents of the device data included in the device data 38, the contents of the form data 32, and the contents of the browsing request. For example, the browsing data created by the CPU 20 may include a number of a second event (for example, a number of incidents where a value in a temperature sensor becomes equal to or greater than 100° C.) that occurred in the devices 60 during a period from when a first event (for example, heating start operation) occurs until when the first event occurs again.

After having created the browsing data, the CPU 20 supplies the created browsing data to the browsing terminal 80 (S104).

When the browsing data is acquired from the server 10, the browsing terminal 80 displays a data browsing screen (see FIG. 20) in the display unit in accordance with the acquired browsing data (S106). The specific user can perform a new browsing request operation in the data browsing screen by changing the browsing condition (for example, the stronghold of which data is to be browsed). In this case, the browsing terminal 80 supplies a browsing request including this new browsing condition to the server 10 (S110).

When the new browsing request is acquired from the browsing terminal 80, the CPU 20 of the server 10 creates new browsing data based on the device data included in the device data 38, the form data 32, and the new browsing condition included in the acquired browsing request (S112). The CPU 20 supplies the created browsing data to the browsing terminal 80 (S114).

When the browsing data is acquired from the server 10, the browsing terminal 80 displays the data browsing screen in the display unit in accordance with the acquired browsing data (S116). As above, the browsing terminal 80 can acquire the browsing data corresponding to the browsing request from the server 10, and display the same in the display unit (S106, S116). The specific user can acknowledge the occurrence states of the respective events in the devices 60 by viewing the data browsing screen displayed based on the browsing data. Further, by supplying the server 10 with a browsing request by changing its browsing condition (that is, the hierarchical level), the occurrence states of the respective events under various conditions can be acknowledged. As a result, the specific user can appropriately manage the devices 60.

Figures 4, 5:
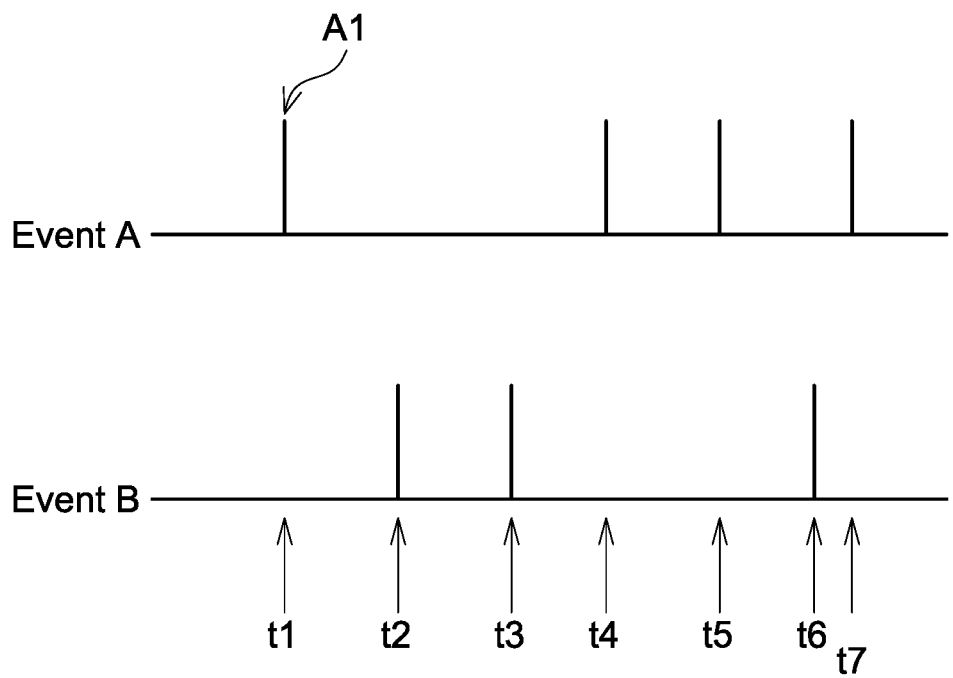
FIG. 4 shows an example of a creating procedure of device data.
FIG. 5 shows an example of the device data.

(Device Data Creating Procedure; FIGS. 4 and 5)

A procedure by which each of the devices 60 creates the device data will be described with reference to FIG. 4. FIG. 4 shows an example in which two types of events, namely a type A and a type B, occur in this device 60. As shown in FIG. 4, in a case where a specific event (A1 in FIG. 4) occurs, the device 60 specifies a type of the specific event (A) and an occurrence time of the specific event (t1). The device 60 associates the device unique number (1001) of itself, the type information indicating the type of the specific event, and the time information indicating the occurrence time of the specific event. As a result, as shown in FIG. 5, the device data in which the device unique number, the type information, and the time information are associated is created.

The device 60 creates its device data by procedure that is same as above when an event occurs after the specific event. Each of the devices 60 supplies the server 10 with their device data as created. Due to this, for example, communication burden on the devices 60 can be mitigated as compared to a case of supplying the server 10 with information indicating event occurrence states in inverse second units.

Figures 6, 7:
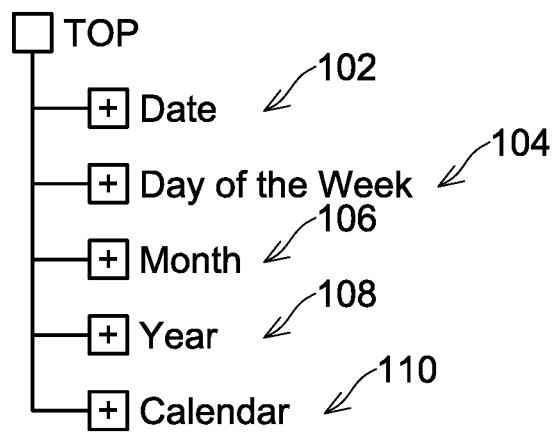
FIG. 6 shows an example of a template data display screen.
FIG. 7 shows an example of a setting screen.

(Template Data Display Screen; FIG. 6)

The template data display screen (see S14 of FIG. 2) that is displayed in the setting terminal 70 in accordance with the template data supplied by the server 10 will be described with reference to FIG. 6.

FIG. 6 shows the template data display screen in an initial state. The template data display screen in the initial state includes a tree structure including respective items of date 102, day of the week 104, month 106, year 108, and calendar 110. When a "+" mark indicated next to each item is selected, data in the corresponding item is expanded. Although not shown, for example, when "+" next to the date 102 is selected, respective items of date number and date name are displayed. The items of the date 102, the day of the week 104, the month 106, the year 108, and the calendar 110 are items for browsing the occurrence states of events in the plurality of devices 60 on a specific date, on a specific day of the week, in a specific month, in a specific year, and in a specific calendar, respectively.

(Setting Screen; FIG. 7)

In a case where a predetermined item adding operation is performed or an operation to select one of the displayed items is performed in the template data display screen of FIG. 6, a setting screen shown in FIG. 7 is displayed next to the tree structure shown in FIG. 6. The setting screen is also a screen displayed in accordance with the template data. The setting screen of FIG. 7 includes a table in which items, values, and types are associated.

In a column of items, items such as "Name", "DispName", "ValueType", "ValueRule", "TargetType", and "SignalNumber" are inputted in advance. In a column of values, information (letters and numbers) corresponding to the respective items can be inputted. In a column of types, attributes of the information inputted to the column of values are displayed in letters. In the column of values, the specific user (as well as the other user, the same applies hereafter) can input information corresponding to the respective items.

"Name" is a data name of an item displayed on the template data display screen. The name indicated by "Name" is a unique name that is not identical with other names. The specific user can input a desired name, such as "Company", in the column of values corresponding to "Name". When the input is performed to the column of values, the column of types is inputted with information indicating text information.

"DispName" is a name with which the item is displayed (displayed name). The specific user can input a desired displayed name, such as "Company", in the column of values corresponding to "DispName". When the input is performed to the column of values, the column of types is inputted with information indicating the text information.

"ValueType" indicates a type of event (such as signal, numerical value, text information, etc.) corresponding to the item. For example, in the devices 60, various types of events occur. The devices 60 output predetermined information each time an event occurs. For example, each device 60 outputs a pulse signal in a case where an event, such as turning on or off of power, starting a heating operation, and an abnormal operation, occurs therein. The pulse signal includes a one-time type signal as well as a signal of type that switches between high and low. Further, in the devices 60, there may be cases where an event of outputting a predetermined numerical value and text information, such as a detection value of a sensor (such as temperature), a model type, an ID and the like, occurs. The specific user can input a value such as "0", "1", and "2" in the column of values corresponding to "ValueType". Here, the values such as "0", "1", and "2" correspond to respective types of "signal" and "numerical value". When the input is performed to the column of values, the column of types is inputted with information indicating integer information, for example.

"ValueRule" indicates a rule related to the information corresponding to the type inputted to "ValueType". Specifically speaking, it indicates whether the information outputted from the devices can be added or not. For example, in a case where the information outputted from the devices 60 is a pulse signal and numerical value information indicating a monetary sum, the number of the pulse signal and the value indicated by the numerical value can be added. Further, even if the information outputted from the devices 60 is a numerical value, in a case where it is a unique value such as a numerical value indicating a model type, the value thereof cannot be added. The user can input a value such as "0", "1", and "2" in the column of values corresponding to "ValueRule". Here, the respective values inputted to the column of values correspond to "non-addable", "addable", and "unique value". When the input is performed to the column of values, the column of types is inputted with information indicating integer information.

"TargetType" indicates a relationship in an actual database structure shown by a tree structure. For example, it indicates a relationship in which a stronghold concept corresponding to a second item is present under a stronghold hierarchical level corresponding to a first item, and the like. The user can input a value such as "0", "1", and "2" in the column of values corresponding to "TargetType". Here, the respective values inputted to the column of values correspond to "no stronghold is present in a lower hierarchical level (corresponding to an item)", "a stronghold is present in the lower hierarchical level", and "an item of a database table is present in the lower hierarchical level", respectively. The column of types is inputted with information indicating integer information.

"SignalNumber" indicates a signal type number defining the device data acquired from each device. By having "SignalNumber" defined, the device data defined by the signal type number is set to a database item value. For example, for each device, unique signal type numbers are allocated, such as "5" for "signal from sensor A" and "6" for "signal from sensor B". In an event where device data are acquired from the devices regarding the database item corresponding to the item having the above values defined, the server 10 cumulates a number of events indicated by the signal type number, and updates the same each time it changes.

The items are displayed in the template data display screen by the specific user inputting necessary information in the setting screen of FIG. 7. The displayed names of the items are the names inputted to "DispName". Further, the items are displayed at positions corresponding to the values inputted to "TargetType".

As above, the specific user can add items to the template data display screen by causing the setting screen to be displayed and inputting the necessary information. As a result, a tree structure as desired by the user can be formed.

Further, as described above, the specific user can also cause the setting screen to be displayed by selecting an already-set item. In this case, the specific user can change the set contents of the item in the displayed setting screen.

Thus, the specific user can create the inputted template data and the master data (that is, the form data) by inputting the necessary information in the template data display screen of FIG. 6 and the setting screen of FIG. 7 based on the template data.

The setting screen shown in FIG. 7 is merely an example. The setting screen in a variant may include other items.

(Example of Form Data; FIGS. 8 to 17)

Next, an example of the form data created by the specific user, who is the user of the setting terminal 70, inputting information in accordance with the template data will be described with reference to FIGS. 8 to 17. Among the form data shown in FIGS. 8 to 17, FIGS. 8 and 9 correspond to the inputted template data (that is, the tree structure created by the specific user (that is, the stronghold hierarchical level structure)), and FIGS. 10 to 17 correspond to the master data.

Figure 8:
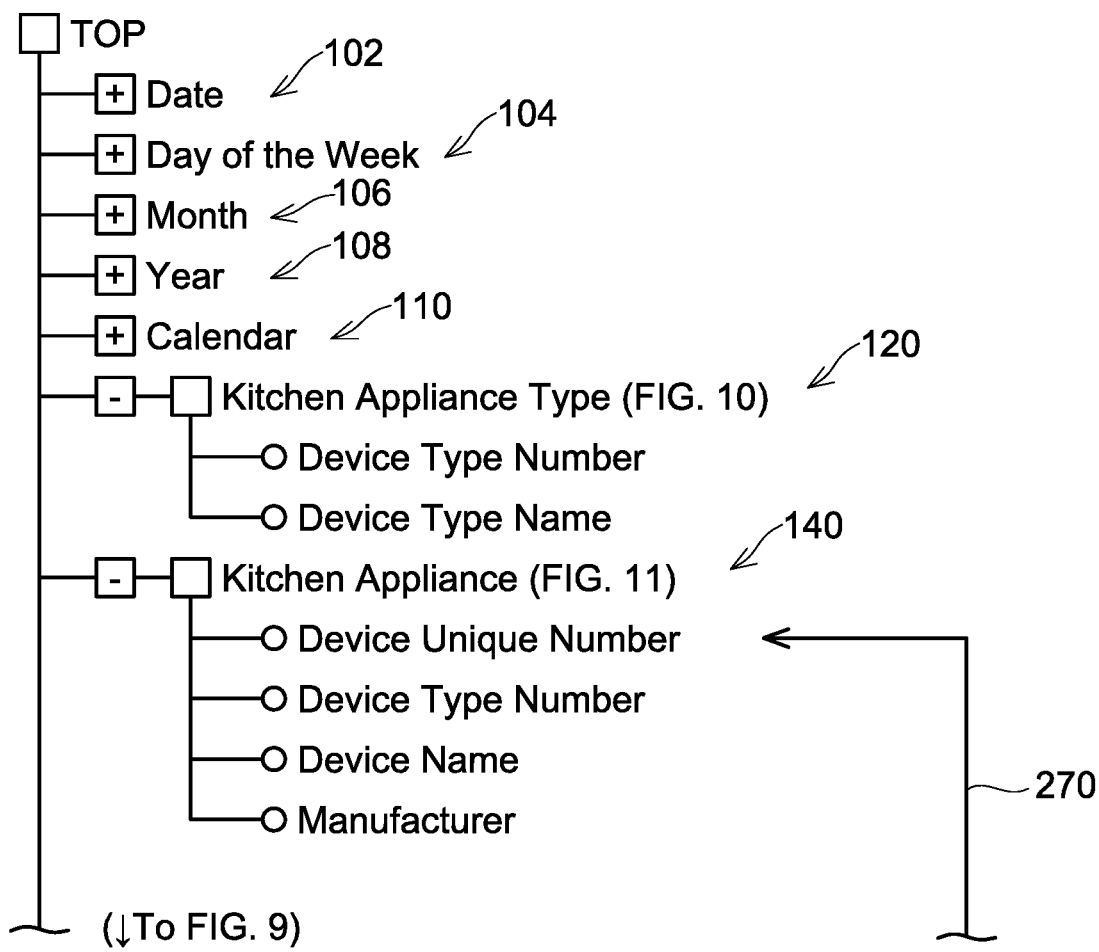
FIG. 8 shows an example of inputted template data.
Figure 9:
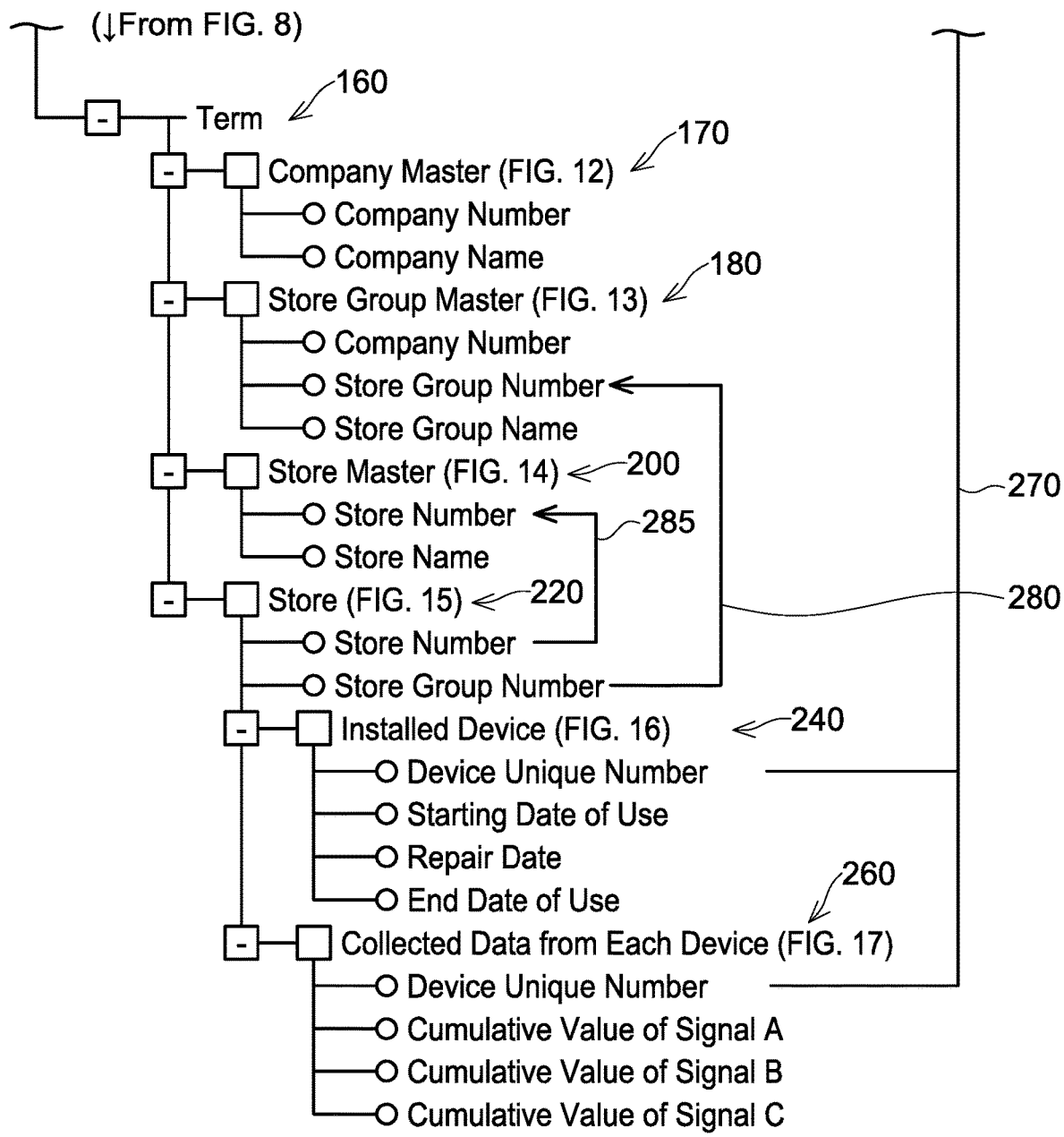
FIG. 9 shows a continuation of the example of the inputted template data.

FIGS. 8 and 9 show a screen to be displayed on the display unit of the setting terminal 70 in accordance with the inputted template data. As shown in FIG. 8, the inputted template data includes the respective items of the date 102, the day of the week 104, the month 106, the year 108, and the calendar 110, similarly to the template data display screen in the initial state (FIG. 6). Further, as shown in FIGS. 8 and 9, the inputted template data includes respective items of kitchen appliance type 120, kitchen appliance 140, and term 160. The term 160 includes respective items of company master 170, store group master 180, store master 200, and store 220 as its lower hierarchical levels. The store 220 includes respective items of installed device 240 and device-collected data 260 as its hierarchical lower levels.

Since the respective items of the date 102, the day of the week 104, the month 106, the year 108, and the calendar 110 in FIG. 8 are same as those in the template data display screen in the initial state (FIG. 6), the detailed description thereof will be omitted.

The kitchen appliance type 120 of FIG. 8 includes respective items of device type number and device type name as its lower hierarchical levels. As shown in FIG. 10, the device type number and the device type name are associated in the kitchen appliance type 120. In FIG. 10, for example, the device type number "1" indicates the device type name "oven".

Further, the kitchen appliance 140 of FIG. 8 includes respective items of the device unique number, the device type number, device name, and manufacturer. In the kitchen appliance 140, as shown in FIG. 11, the device unique number, the device type number, the device name, and the manufacturer are associated. In FIG. 11, for example, the device unique number "1001", the device type number "1", the name "kiln oven", and the manufacturer "T-Electronics" are associated.

Further, as described above, the term 160 of FIG. 9 includes the respective items of the company master 170, the store group master 180, the store master 200, and the store 220 as its lower hierarchical levels. The company master 170 includes respective items of company number and company name. In the company master 170, as shown in FIG. 12, the company number and the company name are associated. In FIG. 12, for example, the company number "1" indicates the company name "S-Café".

Further, the store group master 180 of FIG. 9 includes respective items of the company number, store group number, and store group name. In the store group master 180, as shown in FIG. 13, the company number, the store group number, and the store group name are associated. In FIG. 13, for example, in the company given the company number "1", the store group number "12" corresponds to the store group name "Kanto". Relationships between the store group number and the store group name may be in common among plural companies. That is, as shown in FIG. 13, in a company given the company number "2" as well, the store group number "12" thereof corresponds to the store group name "Kanto".

Further, the store master 200 of FIG. 9 includes respective items of store number and store name. In the store master 200, as shown in FIG. 14, the store number and the store name are associated. In FIG. 14, for example, the store number "170" indicates the store name "S-Café: Marunouchi Store".

Further, the store 220 of FIG. 9 includes respective items of the store number and the store group number. In the store 220, as shown in FIG. 15, the store number and the store group number are associated. In FIG. 15, for example, the store group number "12" and the store number "170" are associated.

Further, as described above, the store 220 of FIG. 9 includes the respective items of the installed device 240 and the device-collected data 260 as its lower hierarchical levels.

The installed device 240 includes respective items of the device unique number, starting date of use, repair date, and end date of use. In the installed device 240, as shown in FIG. 16, the device unique number, the starting date of use, the repair date, and the end date of use are associated.

Further, the device-collected data 260 of FIG. 9 includes respective items of the device unique number, cumulative value of a signal A, cumulative value of a signal B, and cumulative value of a signal C. In the device-collected data 260, as shown in FIG. 17, the device unique number, the cumulative value of the signal A, the cumulative value of the signal B, and the cumulative value of the signal C are associated. The cumulative value of the signal A, the cumulative value of the signal B, and the cumulative value of the signal C respectively indicate cumulative values of respective events that occur in the plurality of devices 60 (that is, total of occurrence number of each event).

Further, in FIGS. 8 and 9, as shown by an arrow 270, the device unique number of the installed device 240 and the device unique number of the kitchen appliance 140 are associated. Similarly, the device unique number of the device-collected data 260 is also associated with the device unique number of the kitchen appliance 140. Due to this, for example, when a device unique number is selected during when the occurrence states of the events for each installed device are browsed in the browsing terminal 80, the occurrence states of the events for each kitchen appliance can be browsed. In this case, a screen for browsing the occurrence states of the events for each installed device and a screen for browsing the occurrence states of the events for each kitchen appliance both are provided with the item related to the device unique number. Generally, the association indicated by the arrow 270 in FIGS. 8 and 9 is called "relation" in some cases.

Other than the above, as shown by an arrow 280 of FIG. 9, the store group number of the store 220 and the store group number of the store group master 180 are associated. Further, as shown by an arrow 285, the store number of the store 220 and the store number of the store master 200 are associated.

The example of the form data was described with reference to FIGS. 8 to 17. As above, when the form data is created, the setting terminal 70 supplies the created form data to the server 10 (see S18 of FIG. 2). The CPU 20 of the server 10 stores the form data in the memory 22 (see S20 of FIG. 2 and reference sign 32 of FIG. 1).

In the above example, the example in which the specific user, who is the user of the setting terminal 70, inputs the information in accordance with the template data to create the form data has been described. No limitation is made thereto, and the same applies to a case where the other user, who is the user of other setting terminal that is not shown, creates form data. However, in this case, contents of the created form data differ from the contents of the form data for the specific user described in FIGS. 8 to 17.

(Condition Setting Screen; FIG. 18)

Next, an example of the aggregation condition setting screen (S36) displayed in accordance with the setting screen data (S34 of FIG. 2) will be described with reference to FIG. 18. When the setting screen data is acquired from the server 10, the setting terminal 70 displays the aggregation condition setting screen shown in FIG. 18 on the display unit (see S34, S36 of FIG. 2).

In the aggregation condition setting screen of FIG. 18, item groups 400, 420 for setting an aggregation condition to be used upon causing the server 10 to execute the partial aggregation (S60, S70 of FIG. 2) are displayed. The item group 400 includes a term selection column 402, a stronghold selection column 404, and a scheme selection column 406.

When the specific user selects the term selection column 402, for example, a pulldown menu including respective items of "date", "day of the week", "month", "year", "calendar", "no setting" and the like is displayed. The respective items displayed in the pulldown menu are determined in accordance with the contents of the inputted template data 34 stored in the memory 22. In selecting one of the items (for example, the "day of the week"), the specific user can further select detailed items (for example, "Monday", etc.).

Similarly, when the specific user selects the stronghold selection column 404, for example, a pulldown menu including respective items of "company", "store group", "store", "shop", and the like is displayed. The respective items displayed in the pulldown menu are determined in accordance with the contents of the inputted template data 34 stored in the memory 22. In selecting one of the items (for example, the "store group"), the specific user can further select detailed items (for example, "Kanto", etc.).

Similarly, when the specific user selects the scheme selection column 406, a pulldown menu including respective items of "AND", "OR", "NOT" is displayed. "AND" means to have an aggregation condition include a criterion of satisfying both the condition of the item selected in the term selection column 402 (for example, "Monday") and the condition of the item selected in the stronghold selection column 404 (for example, "Kanto"). "OR" means to have an aggregation condition include a criterion of satisfying one of the condition of the item selected in the term selection column 402 and the condition of the item selected in the stronghold selection column 404. "NOT" means to have an aggregation condition include a criterion of excluding the condition of the item selected in the term selection column 402 and the condition of the item selected in the stronghold selection column 404.

The item group 420 also includes a term selection column 422, a stronghold selection column 424, and a scheme selection column 426 similar to the columns 402 to 406 of the item group 400. The condition set in the item group 400 and the condition set in the item group 420 are set in AND condition.

Further, in the aggregation condition setting screen of FIG. 18, an item group adding button 430 and a determining button 440 are further displayed. When the specific user operates the item group adding button 430, an item group similar to the item groups 400, 420 is added. When the specific user operates the determining button 440, the aggregation condition including the items set in the respective item groups is determined. Due to this, the setting of the aggregation condition by the specific user is completed. In this case, the setting terminal 70 creates condition data indicating the set aggregation condition (S38), and sends the created condition data to the server 10 (S40).

(Examples of Condition Data; FIG. 19)

Examples of the condition data will be described with reference to FIG. 19. In FIG. 19, the examples of two condition data: condition data C1 and C2 will be described. The condition data C1 includes a first condition of: "term: 2015", "stronghold: Kanto", and "scheme: AND" (corresponding to the item group 400 of FIG. 18) and a second condition of: "term: Monday", "stronghold: no setting", and "scheme: NOT" (corresponding to the item group 420 of FIG. 18). That is, the condition data of this first example indicates an aggregation condition to "create the partially aggregated data of the respective devices located in the Kanto area in the year 2015, however, the data for Mondays will be excluded from the partially aggregated data".

Meanwhile, the condition data C2 only includes a first condition of: "term: no setting", "stronghold: S-Café: Marunouchi Store", and "scheme: AND" (corresponding to the item group 400 of FIG. 18). That is, the condition data of this second example indicates an aggregation condition to "create the partially aggregated data of the respective devices located in the S-Café: Marunouchi Store".

In a case where the condition data C1, C2 shown in FIG. 19 are stored in the memory 22, the CPU 20 of the server 10 executes the partial aggregation in accordance with the condition indicated by the condition data C1 every hour, and stores the partially aggregated data in the memory 22. Further, the CPU 20 executes the partial aggregation in accordance with the condition indicated by the condition data C2 every hour, and stores the partially aggregated data in the memory 22. That is, two types of partially aggregated data are stored in the memory 22 every hour (see S60, S62 of FIG. 2).

(Example of Data Browsing Screen; FIG. 20)

Next, an example of the data browsing screen displayed in the display unit of the browsing terminal 80 of the specific user in accordance with the browsing data (see S104, S114 of FIG. 3) will be described with reference to FIG. 20. In this example, a case where the browsing terminal 80 had inputted the browsing condition of "microwave oven", "Kanto area", "5-Café", and "within one month" in the browsing request is assumed. In this case, the CPU 20 of the server 10 creates browsing data based on the device data included in the device data 38 (see FIG. 1) in the memory 22, the form data 32 in the memory 22, and the browsing condition (that is, "microwave oven", "Kanto area", "S-Café", and "within one month"), and supplies the same to the browsing terminal 80 (see S104, S114 of FIG. 3). When the browsing data is acquired, the browsing terminal 80 displays the data browsing screen shown in FIG. 20 on the display unit (see S106, S116 of FIG. 3).

In the data browsing screen of FIG. 20, the store and the numbers of occurrences of respective events (state A, state B, and state C) are associated. For example, in connection to "S-Café: Marunouchi Store", the screen indicates that the state A occurred hundred times, the state B occurred fifty times, and the state C occurred forty times in one month. As above, the browsing terminal 80 can acquire the browsing data corresponding to the browsing condition included in the browsing request from the server 10, and display it in the display unit. By seeing the data browsing screen displayed based on the browsing data, the specific user can acknowledge the occurrence states of the respective events in the plurality of devices 60 (see S106, S116 of FIG. 3). Further, by supplying the server 10 with browsing requests by changing the browsing conditions thereof, the occurrence states of the respective events under various conditions can be acknowledged. As a result, the specific user can suitably manage the plurality of devices 60.

Although detailed description will not be given for other data browsing screen that the other user displays in the display unit of its browsing terminal, the same applies thereto as the case with the data browsing screen based on the above browsing data (see FIG. 20).

Effects of Embodiment

The communication system 2 of the present embodiment was described above. As above, the CPU 20 of the server 10 executes the partial aggregation of the device data included in the device data 38 (see FIG. 1) every hour in accordance with the aggregation condition indicated by the condition data to create the partially aggregated data, and stores the same in the memory 22 (see S60, S62, S70, S72 of FIG. 2). Further, when the browsing request is acquired from the browsing terminal 80, the CPU 20 uses the partially aggregated data in the memory 22 to create the browsing data, and supplies the created browsing data to the browsing terminal 80 (see FIG. 3). That is, since the CPU 20 creates the browsing data by using the partially aggregated data in the memory 22, the browsing data can be created in a short period of time and be supplied to the browsing terminal 80. Thus, according to the present embodiment, the server 10 can create the browsing data within a short period of time, and the burden on the server 10 upon the creation of the browsing data can be reduced.

In order to reduce the burden on the server 10 upon the creation of the browsing data and to provide the browsing data within a short period of time, employing a configuration in which "the CPU 20 of the server 10 executes the collective aggregation each time the device data is acquired from the device" may be considered, for example. However, in a case of employing this configuration, most part of the partially aggregated data for every pattern created each time the device data is acquired may become unnecessary data, having hardly any possibility of being used in the creation of the browsing data. In this regard, according to the present embodiment as aforementioned, the partial aggregation that the CPU 20 of the server 10 executes every hour selectively targets only those in accordance with the aggregation condition indicated by the condition data. Since the aggregation condition is a condition set by the user, the possibility that the user may wish to browse the data in accordance with the browsing condition corresponding to the aggregation condition in the future is high. Thus, according to the present embodiment, creation of unnecessary partially aggregated data can be suppressed.

Further, the CPU 20 of the server 10 executes the collective aggregation every day to create the partially aggregated data corresponding to all the hierarchical levels, and stores the same in the memory 22 (S80, S82). That is, the partially aggregated data corresponding to all the hierarchical levels is stored in the memory 22 by a relatively long cycle of every day (by a cycle that is at least longer than a cycle for the execution of the partial aggregation of S60, S70). Due to this, in the present embodiment, even if the user has set a new aggregation condition, such as a case where the specific user has changed the aggregation condition, the server 10 can create the partially aggregated data in accordance with this new aggregation condition within a short period of time. Further, in the present embodiment, since the collective aggregation is executed only once a day, the burden on the server 10 can be suppressed relatively low.

As shown in the condition data C1, C2 in FIG. 19, the aggregation condition includes the information indicating the stronghold (for example, "Kanto", "S-Café: Marunouchi Store", etc.). In this case, the CPU 20 of the server 10 aggregates the partially aggregated data related to the stronghold specified by the user. Thus, the server 10 can create the browsing data related to the stronghold specified by the user within a short period of time.

Further, in the present embodiment, when the setting screen request (see S30 of FIG. 2) is acquired from the setting terminal 70, the CPU 20 of the server 10 supplies the setting terminal 70 with the setting screen data (S34 of FIG. 2). The specific user can specify the aggregation condition in accordance with the aggregation condition setting screen (see FIG. 18) displayed in the setting terminal 70. Due to this, the specific user can relatively easily specify the aggregation condition.

Further, in the present embodiment, the aggregation condition indicated by the condition data may include an exclusion condition that does not require aggregation (that is, a condition including "scheme: NOT") in some cases. In a case where the aggregation condition includes the exclusion condition, the CPU 20 excludes data corresponding to the exclusion condition to create the partially aggregated data. Due to this, the server 10 does not need to aggregate unnecessary data. The burden on the server 10 can further be reduced.

(Corresponding Relationships)

The setting terminal 70 and the browsing terminal 80 are examples of "terminal device". The tree structure shown in FIGS. 8 and 9 is an example of "style indicated by form data". The device unique number is an example of "device specifying information". Each of the device data included in the device data 38 of FIG. 1 is an example of "stored data". Signs 170 to 220 of FIG. 9 are examples of "stronghold information". Signs 102 to 110 of FIG. 8 are examples of "term information". The acquisitions of the device data in S50, S54, S64 are examples of process executed by "device data acquiring unit". S52, S56, S66 are examples of process executed by "device data storing unit". S60, S70 are examples of process executed by "partial aggregating unit". S62, S72 are examples of process executed by "partially aggregated data storing unit". The acquisitions of the browsing request in S100, S110 are examples of process executed by "request acquiring unit". S102, S112 are examples of process executed by "browsing data creating unit". S104, S114 are examples of process executed by "browsing data supplying unit". S34 is an example of process executed by "screen data supplying unit". The acquisition of the condition data in S40 is an example of process executed by "condition data acquiring unit". S42 is an example of process executed by "condition data storing unit".

Specific examples of the art disclosed herein have been described in detail, however, these are mere exemplary indications and thus do not limit the scope of the claims. The art described in the claims include modifications and variations of the specific examples presented above. For example, the following modifications may be implemented.

(First Variant) Not being limited to every hour, the CPU 20 may execute the partial aggregation in accordance with the aggregation condition indicated by the condition data in the memory 22 at other timings. For example, the CPU 20 may execute the partial aggregation in accordance with the aggregation condition indicated by the condition data in the memory 22 every time the device data is acquired from the device 60.

(Second Variant) Further, not being limited to every day, the CPU 20 may execute the collective aggregation at other timings (such as every three days). In this case, a cycle by which the CPU 20 executes the collective aggregation is preferably longer period of time than a cycle by which the CPU 20 executes the partial aggregation in accordance with the aggregation condition indicated by the condition data in the memory 22.

(Third Variant) In the scheme selection column 406 of FIG. 18, "NOT" may be unselectable. In this case, the aggregation condition may not include the exclusion condition.

Technical features described in the description and the drawings may technically be useful alone or in various combinations, and are not limited to the combinations as originally claimed. Further, the art described in the description and the drawings may concurrently achieve a plurality of aims, and technical significance thereof resides in achieving any one of such aims.

The invention claimed is:

1. A server for acquiring device data from each of a plurality of devices and storing the acquired device data in a memory, the server comprising:
   a computer,
   wherein the memory that stores computer program including instructions executed by the computer,
   wherein the instructions cause, when executed by the computer, the computer to function as:
      a device data acquiring unit configured to acquire the device data from each of the plurality of devices, each of the device data including device specifying information for specifying corresponding one of the plurality of devices which is a supply source of the device data;
      a device data storing unit configured to store the acquired device data in the memory in accordance with a predetermined style, the predetermined style including stronghold information related to installed locations of the plurality of devices and term information related to operating terms of the plurality of devices;
      a partial aggregating unit configured to aggregate a part of stored data in accordance with a preset aggregation condition and create partially aggregated data, the stored data being the device data which are acquired from each of the plurality of devices and stored in the memory, wherein the partial aggregating unit further aggregates, every specific period of time, data related to corresponding devices for each of a plurality of strongholds corresponding to the stronghold information, each of a plurality of term segments corresponding to the term information, and each of combinations thereof, and creates the partially aggregated data;
      a partially aggregated data storing unit configured to store the created partially aggregated data in the memory;
      a request acquiring unit configured to acquire a browsing request from a terminal device;
      a browsing data creating unit configured to create browsing data indicating operating states in the plurality of devices by using the partially aggregated data in the memory in a case where the browsing request is acquired;
      a browsing data supplying unit configured to supply the created browsing data to the terminal device;
      a screen data supplying unit configured to supply the terminal device with setting screen data for displaying a setting screen for setting the aggregation condition;
      a condition data acquiring unit configured to acquire, from the terminal device, condition data indicating the aggregation condition that is set by a user of the terminal device in accordance with the setting screen represented by the setting screen data; and
      a condition data storing unit configured to store the acquired condition data in the memory,
   wherein the partial aggregating unit creates the partially aggregated data in accordance with the aggregation condition indicated by the condition data stored in the memory,
   the browsing request includes a browsing condition specified by the user of the terminal device, and
   the browsing data creating unit creates the browsing data in accordance with the browsing condition included in the browsing request by using the partially aggregated data in the memory in a case where the browsing request is acquired.

2. The server as in claim 1, wherein the aggregation condition includes information indicating a specific stronghold specified by a user among a plurality of strongholds corresponding to the stronghold information, and
   the partial aggregating unit aggregates data related to one or more devices installed at the specific stronghold among the stored data, and creates the partially aggregated data.

3. The server as in any of claim 1, wherein
   the aggregation condition includes an exclusion condition indicating a condition that does not require aggregation, and
   the partial aggregating unit creates the partially aggregated data by excluding data corresponding to the exclusion condition from the stored data upon creating the partially aggregated data.

4. The server as in claim 1, wherein
   in a case where the user specifies a first browsing condition, the request acquiring unit acquires a first browsing request including the first browsing condition from the terminal device,
   in a case where the first browsing request is acquired, the browsing data creating unit creates first browsing data in accordance with the first browsing condition,
   in a case where the user further specifies a second browsing condition different from the first browsing condition after the user has specified the first browsing condition, the request acquiring unit acquires a second browsing request including the second browsing condition from the terminal device, and
   in a case where the second browsing request is acquired, the browsing data creating unit creates second browsing data in accordance with the second browsing condition.

5. A non-transitory computer-readable storage medium storing a computer program for a server for acquiring device data from each of a plurality of devices and storing the acquired device data in a memory,
   wherein the server comprises a computer, and
   the computer program causes the computer to perform:
      a device data acquiring process for acquiring the device data from each of the plurality of devices, each of the device data including device specifying information for specifying corresponding one of the plurality of devices which is a supply source of the device data;
      a device data storing process for storing the acquired device data in the memory in accordance with a predetermined style, the predetermined style including stronghold information related to installed locations of the plurality of devices and term information related to operating terms of the plurality of devices;
      a partial aggregating process for aggregating a part of stored data in accordance with a preset aggregation condition and creating partially aggregated data, the stored data being the device data which are acquired from each of the plurality of devices and stored in the memory, wherein the partial aggregating process further includes aggregating, every specific period of time, data related to corresponding devices for each of a plurality of strongholds corresponding to the stronghold information, each of a plurality of term segments corresponding to the term information, and each of combinations thereof, and creating the partially aggregated data;

a partially aggregated data storing process for storing the created partially aggregated data in the memory;

a request acquiring process for acquiring a browsing request from a terminal device;

a browsing data creating process for creating browsing data indicating operating states in the plurality of devices by using the partially aggregated data in the memory, in a case where the browsing request is acquired;

a browsing data supplying process for supplying the created browsing data to the terminal device;

a screen data supplying process for supplying the terminal device with setting screen data for displaying a setting screen for setting the aggregation condition;

a condition data acquiring process acquiring, from the terminal device, condition data indicating the aggregation condition that is set by a user of the terminal device in accordance with the setting screen represented by the setting screen data; and a condition data storing process for storing the acquired condition data in the memory, wherein the partially aggregated data is created in the partial aggregating process in accordance with the aggregation condition indicated by the condition data stored in the memory, the browsing request includes a browsing condition specified by the user of the terminal device, and the browsing data is created in the browsing data creating process in accordance with the browsing condition included in the browsing request by using the partially aggregated data in the memory in a case where the browsing request is acquired.

* * * * *